(12) United States Patent
Ishiguri et al.

(10) Patent No.: US 10,302,895 B2
(45) Date of Patent: *May 28, 2019

(54) COMPOSITE PLASTIC LENS AND METHOD OF MANUFACTURING THE SAME

(71) Applicant: CANON KABUSHIKI KAISHA, Tokyo (JP)

(72) Inventors: Shingo Ishiguri, Yokohama (JP); Shusuke Tobita, Kamakura (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/410,553

(22) Filed: Jan. 19, 2017

(65) Prior Publication Data

US 2017/0131512 A1 May 11, 2017

Related U.S. Application Data

(63) Continuation of application No. 14/271,238, filed on May 6, 2014, now Pat. No. 9,581,784.

(30) Foreign Application Priority Data

May 7, 2013 (JP) .................................. 2013-097765

(51) Int. Cl.
*G02B 7/02* (2006.01)
*G02B 1/04* (2006.01)
*B29D 11/00* (2006.01)
*B29C 45/14* (2006.01)

(52) U.S. Cl.
CPC .......... *G02B 7/02* (2013.01); *B29D 11/00009* (2013.01); *B29D 11/00432* (2013.01); *G02B 1/041* (2013.01); *G02B 7/026* (2013.01); *B29C 45/1459* (2013.01); *B29C 45/14336* (2013.01)

(58) Field of Classification Search
CPC .......... G02B 7/02; G02B 7/026; G02B 1/041; B29D 11/00432; B29C 45/14336; B29C 45/1459
See application file for complete search history.

(56) References Cited

U.S. PATENT DOCUMENTS 9,581,784 B2 * 2/2017 Ishiguri .................... G02B 7/02
2012/0323078 A1 * 12/2012 Kikumori ........... B29C 45/0025
600/162

\* cited by examiner

*Primary Examiner* — Joseph P Martinez
(74) *Attorney, Agent, or Firm* — Canon U.S.A., Inc. I.P. Division

(57) ABSTRACT

A composite plastic lens including: a lens having a convex surface, a lens back surface, and a protrusion formed on at least part of an periphery; and a holder, the lens and the holder being molded integrally, wherein the cross-sectional shape of at least part of the lens including an optical axis on the convex surface side is such that a profile line on the convex surface side is curved in a direction getting closer to the lens back side as it goes from the optical axis side toward a turning point out of an optical effective area, and the cross sectional shape of the protrusion is inverted from the turning point out of the optical effective area toward the periphery in a direction away from the lens back surface, and the holder is fitted to the protrusion so as to include the turning point and is molded integrally on the peripheral side of the resin lens.

26 Claims, 5 Drawing Sheets

COMPOSITE PLASTIC LENS AND METHOD OF MANUFACTURING THE SAME

CROSS-REFERENCE TO RELATED APPLICATIONS

This application is a continuation, and claims the benefit, of U.S. patent application Ser. No. 14/271,238, presently pending and filed on May 6, 2014, and claims the benefit of, and priority to, Japanese Patent Application No. 2013-097765 filed May 7, 2013, which applications are hereby incorporated by reference herein in their entireties.

BACKGROUND OF THE INVENTION

Field of the Invention

This disclosure relates to a composite plastic lens in which a resin lens and a resin light-shielding holder are integrated, and a method of manufacturing the same.

Description of the Related Art

The resin lens is used in a wide range of fields such as photographing lenses used in digital cameras or video cameras, recording and reproducing pickup lenses for optical discs, projecting lenses used in projectors. Many of these resin lenses are formed by injection molding for reducing costs. However, in order to cause the resin lens to function in a state of being assembled with a product as a part, the lens may be put into a frame-shaped holder and integrated therewith in a post process. The frame-shaped holder is expressed by terms such as a lens barrel and a lens holder. In this disclosure, a term "holder" is used throughout. In many cases, a gripping portion to be operated in conjunction with an operating portion and a light-shielding portion that limits a light effective area are additionally formed on the holder.

In order to respond requirements such as a reduction in cost and a reduction in weight, the holders used in recent years are made of a resin, and an adhesive agent is generally used for fixing and integrating the holder with the resin lenses. However, for those requiring high degree of positioning accuracy between the lens and holder, the integration with high degree of accuracy is difficult with the adhesive agent. In order to solve the above-described problem, an insert molding technology configured to achieve integration by molding a resin lens in a state in which a resin holder is inserted into a metal mold is disclosed in Japanese Patent Laid-Open NO. 2002-148501. In Japanese Patent Laid-Open NO. 2004-319347, a configuration in which a resin holder inserted into a metal mold at the time of lens formation is held at a predetermined position further reliably is disclosed.

However, the composite mold articles disclosed in the above-described Japanese Patent Laid-Open NO. 2002-148501 and Japanese Patent Laid-Open NO. 2004-319347 each have a problem to be solved.

The configuration of Japanese Patent Laid-Open NO. 2002-148501 has a problem that if a lens resin is injected into a metal mold in a state in which a resin holder is inserted, a colored holder resin fuses and transfers into a transparent lens resin by heat and a shearing force of the lens resin and hence the appearance of the lens is degraded.

In order to solve this problem, in Japanese Patent Laid-Open NO. 2004-319347, occurrence of appearance defects is suppressed by providing a protrusion on a core of a metal mold in which a resin holder is to be inserted so as to hold the holder at a predetermined position by the protrusion even when being subjected to heat and a shearing force during the lens resin is being injected.

However, in a first embodiment of the Japanese Patent Laid-Open NO. 2004-319347, if the injection speed of the lens resin is lowered at the time of lens formation, the time period in which the holder is subjected to heat and a shearing force is increased, so that the colored holder resin cannot be suppressed from fusing and transferring into the transparent lens resin. In particular, the temperature of the lens resin is high, and hence this problem is specifically notable in the vicinity of a gate portion at which the temperature of the resin is high, and which is subjected to a holding pressure. Therefore, there is a problem that the molding conditions are limited at the time of the lens formation.

In a configuration in the embodiment of the Japanese Patent Laid-Open NO. 2004-319347, the holder is embedded around the protrusion of a core, which helps the positioning of insertion of the holder, and if the lens is formed in this state, a level difference of the embedment is transferred to a peripheral portion of the lens. If a ridge caused by the level difference exists on the lens, a problem of ghost caused by a reflection of incident light, which is unexpected in the specification of the lens, may occur.

This disclosure provides a composite plastic lens which prevents a resin light-shielding holder from fusing and transferring into a resin lens and reduces a probability of occurrence of ghost, and a method of manufacturing the composite plastic lens.

SUMMARY OF THE INVENTION

This disclosure provides a composite plastic lens including: a resin lens including a convex surface, a lens surface on the side opposite to the convex surface, a side surface, a protrusion protruding from at least part of the side surface, and a resin light-shielding holder configured to hold the resin lens, wherein the resin lens is joined with the resin light-shielding holder at the protrusion on the side of the convex surface, and an interface of the resin light-shielding holder with respect to the protrusion on the side of the convex surface is inclined inward from an outer periphery of the composite plastic lens in a direction approaching the lens surface on the side opposite to the convex surface, and an angle F formed between the interface and a plane including a line orthogonal to an optical axis falls within a range from 5° to 80°.

This disclosure also provides a method of manufacturing a composite plastic lens including: a resin lens including a convex surface, a lens surface on the side opposite to the convex surface, a side surface, and a protrusion protruding from at least part of the side surface; a resin light-shielding holder configured to hold the plastic lens including: forming a cavity including a first space having the shape for transferring the convex surface and the shape for transferring a lens surface on the side opposite to the convex surface formed therein and a second space formed by the depressed portion in a mold having the resin light-shielding holder having the depression inserted therein; and injecting the resin into the cavity from the depressed portion; wherein the second space becomes narrower as it goes toward the first space.

Further features of the present invention will become apparent from the following description of exemplary embodiments with reference to the attached drawings.

DESCRIPTION OF THE EMBODIMENTS

Figure 1A:
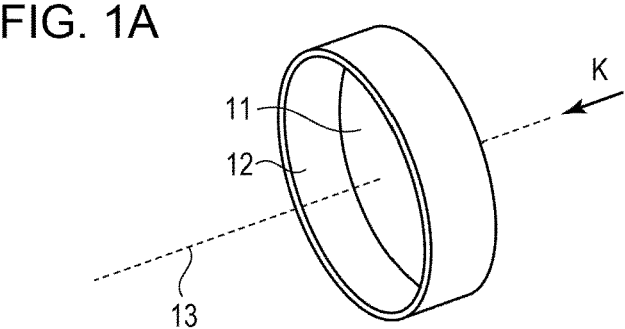
FIGS. 1A to 1C are schematic drawings illustrating an embodiment of a composite plastic lens of this disclosure.

Referring now to the drawings, an embodiment of a composite plastic lens of this disclosure will be described in detail.

Figure 1B:
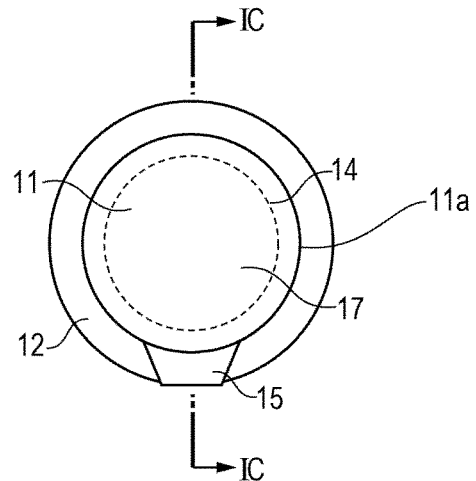
Figure 1C:
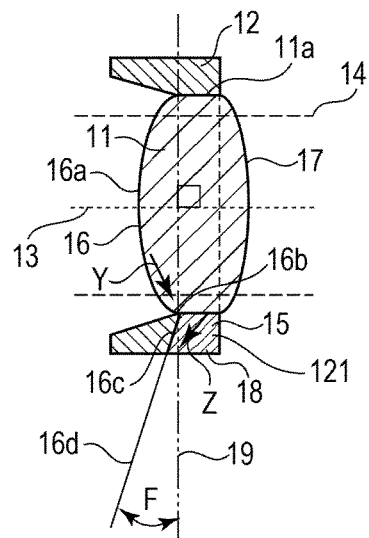

FIGS. 1A to 1C are schematic drawings illustrating an embodiment of the composite plastic lens of this disclosure. FIG. 1A is a perspective view of the composite plastic lens of this disclosure. Reference sign 11 denotes a resin lens (hereinafter, may be briefly referred to as "lens"), and reference sign 12 denotes a resin light-shielding holder (hereinafter, may be briefly referred to as "holder") in the drawing. The composite plastic lens of this disclosure is a lens including the lens 11 having a convex surface 16a, a surface on the side opposite to the convex surface (for example, referred to as "lens back surface") 17, and a protrusion 15 protruding from at least part of a side surface 11a, and the holder 12 configured to hold the lens 11 being molded integrally with each other. The lens 11 is a lens having a convex surface at least on one of two front and back surfaces of an optical surface, and includes both-side convex-surface lenses or meniscus lenses. The shape of the optical surface of the lens 11 is not specifically limited, and may be not only a spherical shape, but also a non-spherical shape or a free curved surface, for example. The outer shape of the lens 11 is not specifically limited, and may be a round lens, a square lens, or an elongated lens may be employed, for example. The holder 12 forms a light-shielding shape on a convex surface side of the lens 11, and has a function to block unnecessary light entering from the convex surface side. The light-shielding shape of the holder 12 may be formed not only on the convex surface side, but also on a surface opposite to the convex surface. The holder 12 itself may have a function of a lens barrel, and the functions of the holder 12 are not limited. The holder 12 may have a positioning reference shape on a peripheral shape in order to allow easy assembly to the lens barrel.

FIG. 1B is a front view of the composite plastic lens viewed from a direction K illustrated in FIG. 1A, that is, a front view viewed from a back surface on the side opposite to the convex surface. Reference numeral 14 denotes an optical effective portion defining line, that is, a boundary between an optical effecting portion and an optical non-effective portion of the lens 11. Reference sign 15 denotes the protrusion protruding from the side surface 11a of the lens integrally. The protrusion is formed by injecting an injected resin into a depressed portion 121 provided on the holder 12 so as not to impair the shape of the holder 12, and solidifying the injected resin that forms the lens. With the provision of the protrusion 15 as described above, the holder 12 may be brought into contact with the entire periphery (the side surface of the lens 11 except for the portion of the protrusion 15 projecting from the side surface of the lens) of the side surface 11a of the lens 11. In this configuration, a shape for constraining a positional relationship between the lens 11 and the holder 12 can easily be provided. With the shape that constrains the positional relationship as described above, there is an advantage that a configuration in which adhesion is achieved without coming apart even in the case of a combination of a lens material and a holder material that are not adhered to each other with a high adhesive force is easily achieved. However, if the lens material and the holder material have sufficient adhesiveness, a configuration in which the holder 12 is not positioned over the entire periphery (the side surface of the lens 11 except for the portion of the protrusion 15 projecting from the side surface of the lens) of the side surface 11a of the lens 11 is also applicable. For example, a configuration in which the protrusion 15 and the holder are brought into tight contact with each other such that the protrusion 15 extends over the entire periphery of the composite plastic lens to constrain each other is also applicable.

FIG. 1C is a cross-sectional view taken along a plane including an optical axis 13 of the composite plastic lens of this disclosure, viewed from a cross section taken along a line IC-IC illustrated in FIG. 1B. The shape of the cross section of the lens 11 on the side of the convex surface 16a of at least part thereof including the optical axis 13 is such that a profile line 16 on the side of the convex surface 16a is curved in a direction Y getting closer to the lens back surface 17 as it goes from the optical axis 13 (the center side of the lens) toward the composite plastic lens periphery 18. Then, the profile line 16 is inverted into a direction Z getting farther from the lens back surface 17 from a certain point 16b as a turning point. This point of inversion is referred to as a turning point in this specification. In other words, the cross section of the lens 11 is such that the profile line 16 on the side of the convex surface 16a is inverted from a direction getting closer to the surface opposite to the convex surface 16a (for example, lens back surface) 17 at the turning point 16b from the optical axis 13 toward the composite plastic lens periphery 18, thereby forming a turning surface 16c. In still other words, the cross-sectional shape of the resin lens on the side of the convex surface 16a including the optical axis 13 and the protrusion is such that the profile line extending from the optical axis 13 toward the lens periphery 18 on the side of the convex surface 16a is curved in the direction Y getting closer to the lens back surface from the optical axis 13 to the turning point 16b, and then inverted in the direction Z away from the lens back surface from the turning point 16b to the lens periphery 18.

In other words, the resin lens 11 is joined with the resin light-shielding holder 12 at least at the protrusion 16c on the side of the convex surface, and an interface of the resin light-shielding holder 12 with respect to the protrusion on the side of the convex surface is inclined inward from an outer periphery 18 of the composite plastic lens in a direction approaching the back surface of the lens.

Furthermore, the holder 12 is configured to fit the protrusion 15 including the turning point 16b and be molded integrally to the lens periphery 18 of the lens 11.

The turning point 16b corresponds to a point where an end portion of the convex surface 16a and an end portion of the holder 12 abut against each other. The range of the abutment means that the end portion of the convex surface 16a and the end portion of the holder 12 coincide or that a distance between the end portion of the convex surface 16a and the end portion of the holder 12 is in abutment with each other with a distance within 1 mm therebetween.

An angle F between a line 19 passing through the turning point 16b and orthogonal to the optical axis 13 and an extended plane 16d of the turning surface 16c of the protrusion 15 inverted from the turning point 16b toward the composite plastic lens periphery 18 in the direction Z away from the lens back surface 17 is preferably within a range from 5° to 80°, preferably, from 10° to 80°. In other words, an angle F formed between the interface and a plane including a line orthogonal to an optical axis falls within a range from 5° to 80°, more preferably, a range from 10° to 80°. It is because that if the angle F is smaller than 5°, an effect of suppressing the holder 12 from fusing and transferring to the lens 11 cannot be achieved sufficiently and, if the angle F is larger than 80°, the thickness of the holder 12 cannot be obtained and hence the light-shielding effect is impaired. With the composite plastic lens, the holder may be suppressed from fusing and transferring to the optical surface of the lens further effectively.

Subsequently, an embodiment of a method of manufacturing the composite plastic lens of this disclosure will be described in detail.

Figure 2:
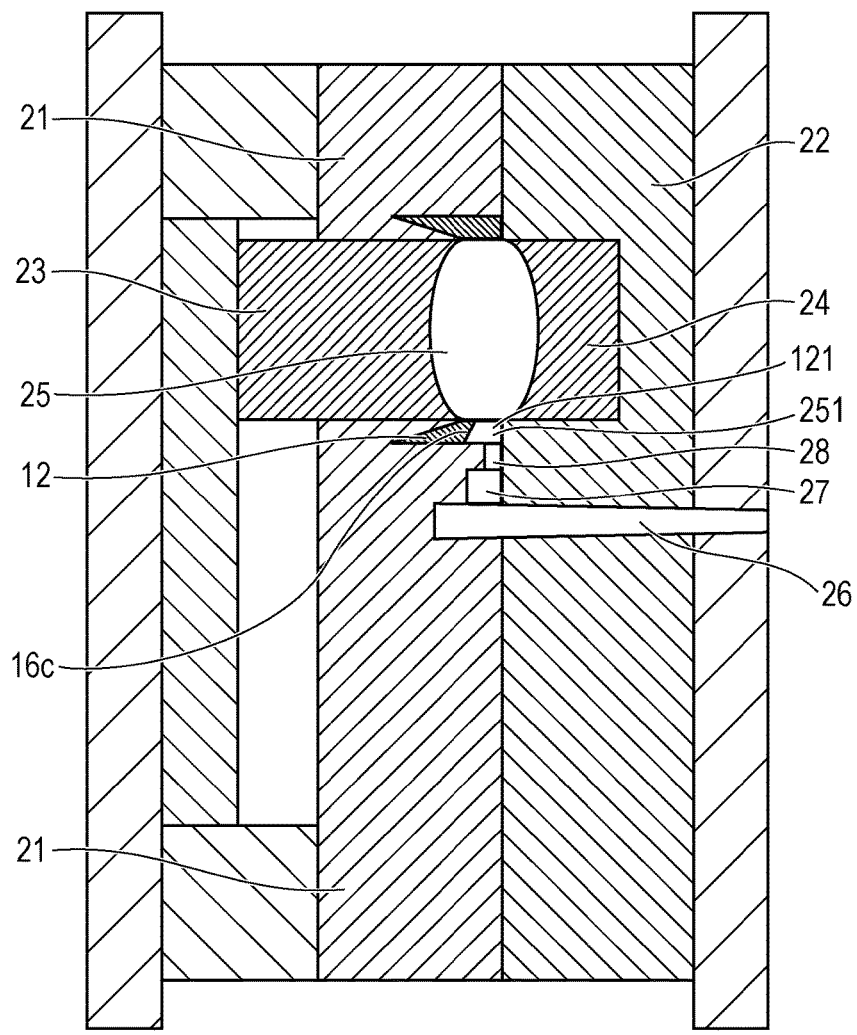
FIG. 2 is a schematic drawing illustrating a metal mold for an injection molding used in a method of manufacturing the composite plastic lens of this disclosure.

FIG. 2 is a schematic drawing illustrating a metal mold for an injection molding used in a method of manufacturing the composite plastic lens of this disclosure. FIG. 2 illustrates a configuration of a plastic molding metal mold used for forming the composite plastic lens. Reference numeral 21 denotes a movable-side metal mold, reference numeral 22 denotes a fixed-side metal mold, reference numeral 23 denotes a movable-side convex surface transfer member configured to transfer an optical surface of the lens convex surface, and reference numeral 24 denotes a fixed-side back surface transfer member configured to transfer an optical surface on the lens back surface. The optical surface transfer members 23 and 24 may have a configuration integrated with the metal mold. In other words, a configuration in which a shape configured to transfer the optical surface of the lens convex surface is formed on the movable-side metal mold and a shape configured to transfer the optical surface of the lens back surface is formed on the fixed-side metal mold is also applicable.

Alternatively, the movable-side metal mold and the fixed-side metal mold may be provided reversely from this embodiment. In other words, a configuration in which the back surface transfer member is stored in the movable-side metal mold 21 and a convex surface transfer member is stored in the fixed-side metal mold 22 is also applicable. Alternatively, the respective optical surface transfer members 23 and 24 may be integrated with the meal mold. In other words, a shape configured to transfer the optical surface of the lens back surface may be formed on the movable-side metal mold and a shape configured to transfer the optical surface of the lens convex surface may be formed on the fixed-side metal mold. Reference numeral 25 denotes a first space formed by the metal mold, which defines the shape of the lens 11.

The holder 12 is inserted into the movable-side metal mold 21, and then the metal mold is closed by an operation of an injection molding machine, which is not illustrated. Accordingly, as described above, the first space 25 having the shape for transferring the convex surface and the shape for transferring a lens surface on the side opposite to the convex surface is formed. The holder 12 includes the depressed portion 121 as described above, and hence a second space 251 is formed by the depressed portion 121 and the metal mold. The first space 25 and the second space 251 constitute a cavity.

In a state in which the metal mold is closed, a resin as the lens material is injected into the cavity from the second space 251 formed by the depressed portion 121 and is filled therein. The resin injected from the injection molding machine, which is not illustrated, is filled into the cavities (25, 251) via a spur 26, a runner 27, and a side gate 28 from the space 251 formed by the depressed portion 121.

At this time, the second space 251 is formed so as to be narrower as it goes toward the first space 25 by inclining the depressed portion on the side of the convex surface. This inclined surface corresponds to the turning surface 16c of the holder described above. When the resin is injected from the depressed portion into the cavity to form the resin light-shielding holder and the resin integrally, the holder is suppressed from fusing and transferring to the optical surface of the lens.

The cross-sectional shape of the side gate 28 may be a rectangular shape, a trapezoidal shape, an oval shape, and a semi-circular shape. After the injected and filled resin has cooled and solidified, the metal mold is opened and a molded product is taken out. Subsequently, the side gate 28 of the taken one molded product is cut off by a mechanical process or the like, so that the composite plastic lens of this disclosure is obtained.

Cutting the side gate 28 may be performed by using a method of dividing by an action of mold opening. The holder 12 may be arranged in the movable-side metal mold 21 as a temporary molded product formed by two-color molding method without insertion.

Materials including transparent resins such as styrene resin, polycarbonate resin, methacrylate resin, or olefin resin may be used as the lens material depending on the application. A resin which is opacified by coloring or the like is preferably used as the holder material in order to obtain a light-shielding function. For example, a resin including at least one of ABS resin, nylon resin, and polycarbonate resin or a resin including at least one of ABS resin, nylon resin, and polycarbonate resin mixed with at least one of fillers including glass bead, glass fiber, or carbon fiber may be used. When the softening temperature of a combination of materials of the resin light-shielding holder is higher than the softening temperature of the resin lens, fusion and transfer of the holder during the molding is reduced, and in addition, the temperature of the metal mold can be set to a temperature close to the softening temperature of the lens material, so that advantages such that an error in the shape of the optical surface can be reduced are preferably achieved.

According to the configuration of the composite plastic lens of this disclosure, a force toward the optical surface that the holder receives from the injected resin when a flow front of the injected resin touches the holder at the time of injection molding becomes sufficiently small, so that the holder may be prevented from fusing and transferring to the optical surface. Since the end portion of the lens optical surface and the end portion of the holder come into abutment with each other at the turning point, a portion of the lens other than the optical surface is shielded by the holder, that is, the light-shielding effect of the holder is not impaired. Therefore, unnecessary reflection can hardly occur in an optical system, and hence ghost hardly occurs. Consequently, the composite plastic lens including the lens having a good optical performance and the holder is obtained.

EXEMPLARY EMBODIMENTS

Detailed Exemplary Embodiments will be described below.

Exemplary Embodiment 1

Figure 3A:
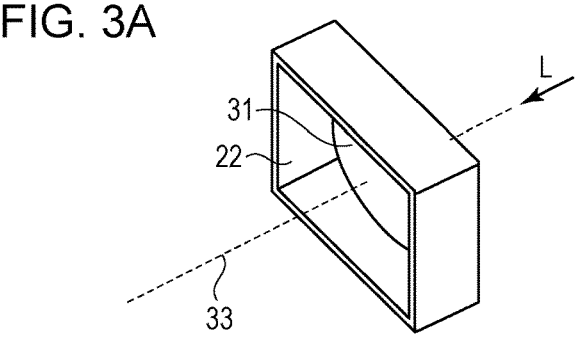
FIGS. 3A to 3C are schematic drawings illustrating a composite plastic lens of Exemplary Embodiment 1 of this disclosure.
Figure 3B:
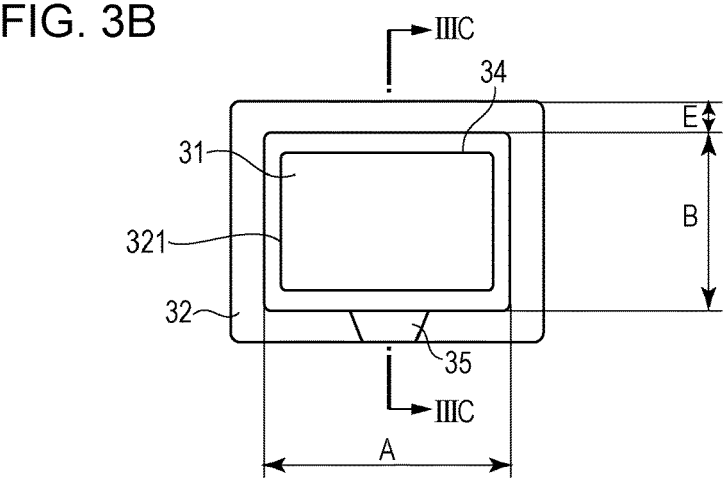
Figure 3C:
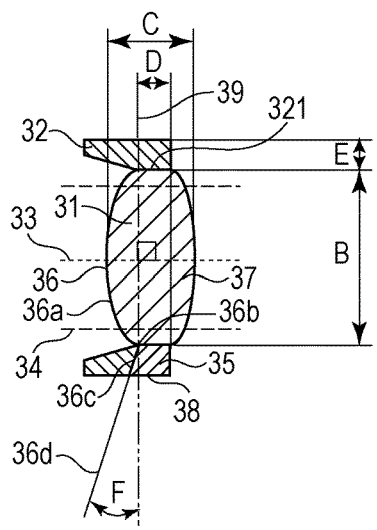

FIGS. 3A to 3C are schematic drawings illustrating a composite plastic lens of Exemplary Embodiment 1 of this disclosure. FIG. 3A is a perspective view of composite plastic lens of Exemplary Embodiment 1. FIG. 3B is a front view of the composite plastic lens of Exemplary Embodiment 1 viewed from a direction L illustrated in FIG. 3A, that is, a front view viewed from a surface on the side opposite to the convex surface. In the drawing, reference numeral 31 denotes a lens, reference numeral 32 denotes a holder, reference numeral 33 denotes an optical axis, reference numeral 34 denotes an optical effective area defining line, reference numeral 35 denotes a protrusion, reference numeral 36 denotes a profile line, reference numeral 36a denotes a convex surface, reference numeral 36b denotes a turning point, reference numeral 36c denotes a turning surface, reference numeral 36d denotes a profile line, reference numeral 37 denotes a lens back surface, reference numeral 38 denotes a composite plastic lens periphery, reference numeral 39 denotes a surface passing through the turning point 36b and orthogonal to the optical axis.

The lens 31 is a methacrylate resin lens having double convex spherical surfaces, and has a square lens shape having a lateral length A of 20 mm, a vertical length B of 15 mm, a center thickness C of 5 mm, and a thickness D of the periphery of 2 mm. The holder 32 is a holder formed of a composite material, which is polycarbonate resin mixed with glass fiber by 20 weight percent. The holder 32 includes an inner peripheral shape extending along the periphery of the lens 31, and the outer peripheral shape which is a substantially similar figure of the inner peripheral shape. The thickness E of the holder 32 is 2 mm at a position where the holder 32 and the outer peripheral portion of the lens 31 come into contact with each other, and the thickness is reduced as it gets closer to an extremity of the light-shielding portion. Reference numeral 34 denotes the optical effective portion defining line, that is, a boundary between an optical effecting portion and an optical non-effective portion of the lens 31. An inner side surface 321 of the holder 32 is formed along 1 mm outer peripheral side of the optical effective portion defining line 34.

FIG. 3C is a cross-sectional view of the composite plastic lens of Exemplary Embodiment 1 viewed from a cross section taken along a line IIIC-IIIC indicated in FIG. 3B, and the cross section is positioned so as to include the optical axis 33 and the protrusion 35. The cross section of the lens 31 is such that the profile line 36 on the side of the convex surface 36a is inverted from a direction getting closer to the lens back surface 37 on the side opposite to the convex surface 36a to a direction away from the same at the turning point 36b from the optical axis 33 side toward the composite plastic lens periphery 38, thereby forming the turning surface 36c. Also, the holder 32 is molded integrally on the lens periphery 38 side including the turning point 36b. An angle F between the line 39 passing through the turning point 36b and orthogonal to the optical axis 33 and the profile line 36d of the turning surface 36c of the protrusion 35 is 25°.

Subsequently, a process of molding the composite plastic lens of Exemplary Embodiment 1 will be described with reference to FIG. 4. In the drawing, reference numeral 41 denotes a movable-side metal mold, reference numeral 42 denotes a fixed-side metal mold, reference numeral 43 denotes movable side convex surface transfer member, reference numeral 44 denotes a fixed-side back surface transfer member, reference numeral 32 denotes the holder, reference numeral 45 denotes a first space, reference numeral 451 denotes a second space, reference numeral 46 denotes a side gate, reference numeral 47a denotes an injected resin, reference numeral 47b denotes a flow front, reference numeral 48a denotes a turning point forming portion, reference numeral 48b denotes a turning point forming portion, reference numeral 48c denotes a turning surface forming portion, reference numeral 48d denotes a member end portion, reference numeral 48e denotes a holder end portion, and reference numeral 49 denotes a surface on the side opposite to the convex surface forming portion.

Figure 4A:
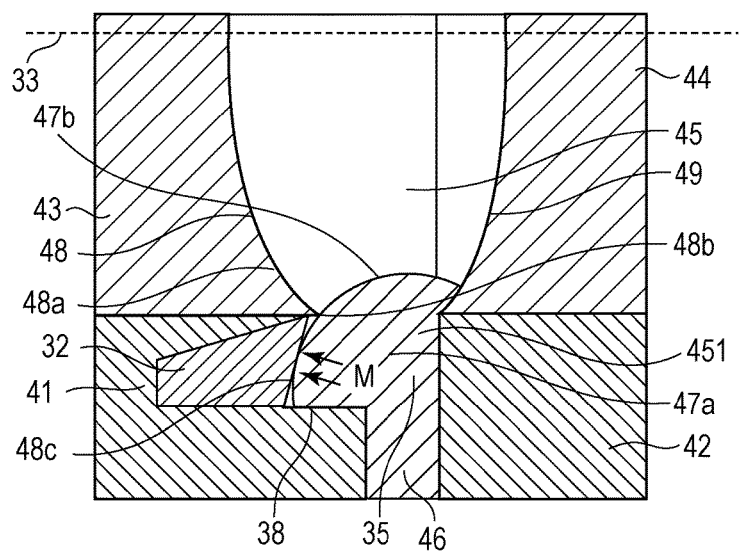
FIGS. 4A to 4D are schematic drawings illustrating a metal mold for an injection molding used in a method of manufacturing the composite plastic lens of Exemplary Embodiment 1 of this disclosure.
Figure 4B:
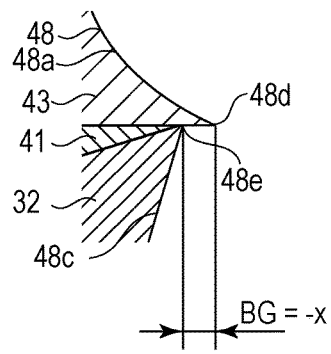
Figure 4C:
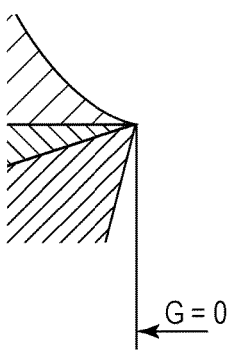
Figure 4D:
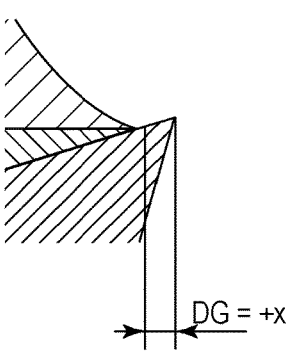

FIG. 4A illustrates a cross-sectional view in the metal mold, and includes the optical axis 33 and the protrusion 35. The cross-sectional shape of the side gate 46 is a rectangular shape having a width of 3 mm and a thickness of 1 mm. Reference numeral 48a denotes the convex surface forming portion, and reference numeral 49 denotes the lens back surface forming portion on the side opposite to 48a. FIGS. 4B to 4D are enlarged views of a portion in the vicinity of the turning point forming portion 48b in FIG. 4A, and illustrates positive or negative of a distance G between the member end portion 48d of the movable side convex surface transfer member 43 and the holder end portion 48e of the movable-side metal die, which are in contact with each other. The distance G is expressed with "+" when the holder end portion 48e is closer than the member end portion 48d to the surface 49 on the side opposite to the convex surface forming portion 48a, and with "−" when it is farther. The range of the distance G is preferably −1.1 mm≤G'+1.1 mm, and more preferably, −1.0 mm≤G≤+1.0 mm. In other words, in the cavity, when a protruding amount of the holder 32 between the first space 45 and the second space 451 is DG, the value of DG is preferably not larger than 1.1 mm, and more preferably, not larger than 1.0 mm.

In addition, in the cavity, when a protruding amount of the movable side convex surface transfer member 43, which is part of the metal mold, between the first space 45 and the second space 451 is BG, the value of BG is preferably not larger than 1.1 mm, and more preferably, not larger than 1.0 mm.

In Exemplary Embodiment 1, the distance G was +0.1 mm. The molding conditions were a metal mold temperature regulation of 100° C., a cylinder temperature regulation of 260° C., and an injection speed from 1 to 50 mm/sec by using a screw cylinder having a diameter of 25 mm. In addition to the cavity 45, the metal mold has five cavities, which are the same as the cavity 45, so that six composite plastic lenses can be molded at one time.

FIG. 4A illustrates a state in the course in which the injected resin 47a is being filled in the cavity 45. Normally, the injected resin 47a is in the form of a fountain flow in the course of molding, and hence the flow front 47b flows in a concentric fashion from the side gate 46. The turning surface forming portion 48c is inclined so as to increase a distance from the lens surface forming portion 49 as it goes from the optical axis 33 side toward the lens periphery 38 side. Therefore, when the flow front 47b comes into contact with the holder 32, an orientation M of a pressure that the holder 32 receives from the injected resin 47a is a direction of pressing against the movable side metal mold 41. Therefore, the holder 32 is prevented from fusing and transferring to the optical surface of the lens. Since the member end portion 48*d* and the holder end portion 48*e* are substantially in abutment with each other in the turning point forming portion 48*b*, when viewing the composite plastic lens from the convex surface 36*a* side, the shapes other than the optical surface of the lens are not visible, so that the ghost did not occur when used in the product.

Exemplary Embodiment 1b

The angle F was 25°, and the distance G was +1.0 mm. Other conditions were the same as Exemplary Embodiment 1.

Exemplary Embodiment 1c

The angle F was 25°, and the distance G was −0.1 mm. Other conditions were the same as Exemplary Embodiment 1.

Exemplary Embodiment 1d

The angle F was 25°, and the distance G was −1.0 mm. Other conditions were the same as Exemplary Embodiment 1.

Exemplary Embodiment 1e

The angle F was 10°, and the distance G was +1.0 mm. Other conditions were the same as Exemplary Embodiment 1.

Exemplary Embodiment 1f

The angle F was 10°, and the distance G was +1.0 mm. Other conditions were the same as Exemplary Embodiment 1.

Exemplary Embodiment 1g

The angle F was 10°, and the distance G was −0.1 mm. Other conditions were the same as Exemplary Embodiment 1.

Exemplary Embodiment 1h

The angle F was 10°, and the distance G was −0.1 mm. Other conditions were the same as Exemplary Embodiment 1.

Exemplary Embodiment 1i

The angle F was 80°, and the distance G was +1.0 mm. Other conditions were the same as Exemplary Embodiment 1.

Exemplary Embodiment 1j

The angle F was 80°, and the distance G was +1.0 mm. Other conditions were the same as Exemplary Embodiment 1.

Exemplary Embodiment 1k

The angle F was 80°, and the distance G was −0.1 mm. Other conditions were the same as Exemplary Embodiment 1.

Exemplary Embodiment 1l

The angle F was 80°, and the distance G was −0.1 mm. Other conditions were the same as Exemplary Embodiment 1.

Exemplary Embodiments 1b to 1l have configurations in which the angle F and the distance G of Exemplary Embodiment 1 are changed variously. A result of experiment from Exemplary Embodiments 1 to 11 will be shown in Table 1. In Exemplary Embodiments 1 to 1l, fusion and transfer of the holder to the lens was not observed, the shape other than the optical surface of the lens was not visible even when viewing from the convex surface side, and a desirable composite plastic lens in which no ghost was generated even used in the product was obtained.

Evaluation of Fusion and Transfer
double circle: No Fusion and Transfer occurred
circle: Small Amount of Fusion and Transfer occurred
cross: Large Amount of Fusion and Transfer occurred
Evaluation of Ghost
double circle: No ghost occurred in an evaluation test
circle: Small Amount of Ghost Generated in the evaluation test

TABLE 1

| | Angle F [°] | Distance G [mm] | Fusion and Transfer | Ghost |
|---|---|---|---|---|
| Exemplary Embodiment 1 | 25 | +0.1 | ◎ | ◎ |
| Exemplary Embodiment 1b | 25 | +1.0 | ◎ | ◎ |
| Exemplary Embodiment 1c | 25 | −0.1 | ◎ | ◎ |
| Exemplary Embodiment 1d | 25 | −1.0 | ◎ | ◎ |
| Exemplary Embodiment 1e | 10 | +0.1 | ◎ | ◎ |
| Exemplary Embodiment 1f | 10 | +1.0 | ◎ | ◎ |
| Exemplary Embodiment 1g | 10 | −0.1 | ◎ | ◎ |
| Exemplary Embodiment 1h | 10 | −1.0 | ◎ | ◎ |
| Exemplary Embodiment 1i | 80 | +0.1 | ◎ | ◎ |
| Exemplary Embodiment 1j | 80 | +1.0 | ◎ | ◎ |
| Exemplary Embodiment 1k | 80 | −0.1 | ◎ | ◎ |
| Exemplary Embodiment 1l | 80 | −1.0 | ◎ | ◎ |

Exemplary Embodiment 2

Figure 5:
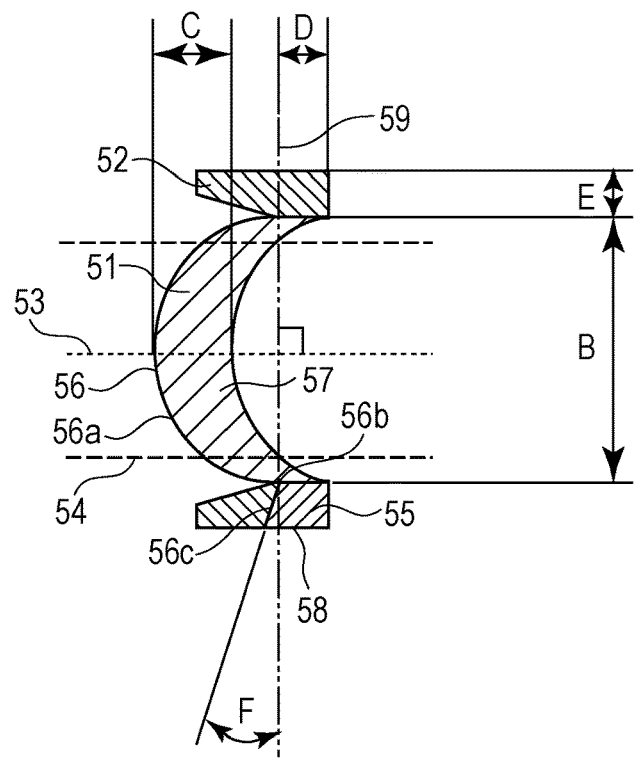
FIG. 5 is a schematic drawing illustrating a composite plastic lens of Exemplary Embodiment 2 of this disclosure.

FIG. 5 is a schematic drawing illustrating a composite plastic lens of Exemplary Embodiment 2 of this disclosure. In the drawing, reference numeral 51 denotes a lens, reference numeral 52 denotes a holder, reference numeral 53 denotes an optical axis, reference numeral 54 denotes an optical effective area defining line, reference numeral 55 denotes a protrusion, reference numeral 56 denotes a profile line, reference numeral 56*a* denotes a convex surface, reference numeral 56b denotes a turning point, reference numeral 56c denotes a turning surface, reference numeral 56d denotes a profile line, reference numeral 57 denotes a concave surface opposite to the convex surface 56a, reference numeral 58 denotes a composite plastic lens periphery, and reference numeral 59 denotes a surface passing through the turning point 56b and orthogonal to the optical axis 53.

In the composite plastic lens of Exemplary Embodiment 2 in FIG. 5, a cross section is positioned so as to include the optical axis 53 and the protrusion 55. The lens 51 is a convex meniscus lens having the convex surface 56a and the concave surface 57 on the back surface. A cross section of the lens 51 is such that the profile line 56 on the convex surface 56a side is inverted from a direction getting closer to the concave surface 57 in the direction away from the same at the turning point 36b from the optical axis 53 side toward the composite plastic lens periphery 58 side, thereby forming the turning surface 56c. Also, the holder 52 is molded integrally on the periphery 58 side including the turning point 56b. The angle F between the surface 59 passing through the turning point 56b and orthogonal to the optical axis 53 and the turning surface 56c extending toward the periphery 58 of the lens 51 is 25°. In the composite plastic lens of Exemplary Embodiment 2, no fusion and transfer of the holder 52 into the lens 51 occurred and no ghost was generated when used in the product.

Comparative Example 1

A process of molding the composite plastic lens of Comparative Example 1 will be described with reference to FIG. 6. In the drawing, reference numeral 61 denotes a holder, reference numeral 62 denotes an optical axis, reference numeral 63 denotes a turning surface forming portion, reference numeral 64a denotes a resin, reference numeral 64b denotes a flow front, reference numeral 65 denotes a fused portion, and reference numeral 66 denotes a lens periphery.

Figure 6:
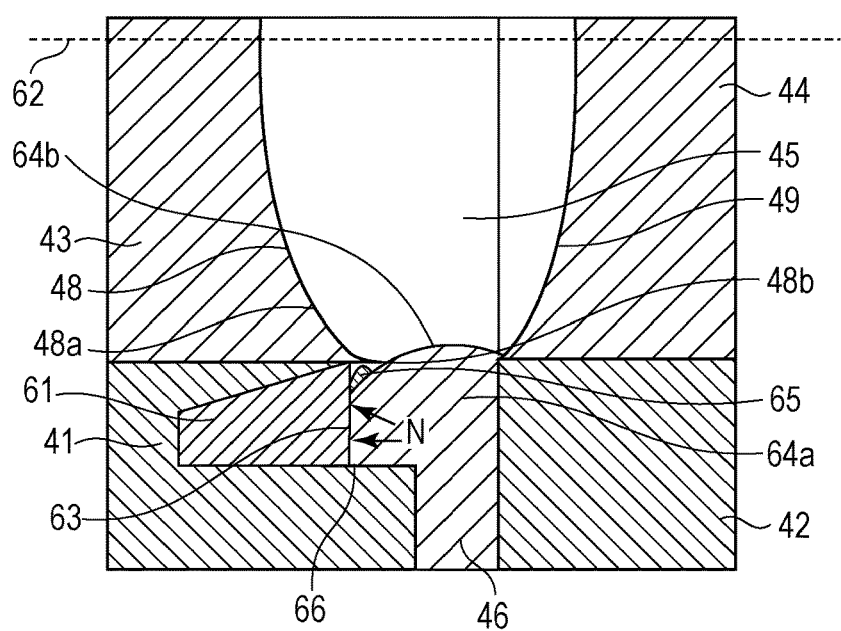
FIG. 6 is a schematic drawing illustrating a metal mold for an injection molding used in a method of manufacturing the composite plastic lens of Comparative Exemplary Embodiment 1.

FIG. 6 is a cross-sectional view in the metal mold, and includes the optical axis 62 and the side gate 46. The lens material is a methacrylate resin. The holder material is a composite material, which is a polycarbonate resin mixed with glass fiber by 20 weight percent. Since the metal mold is the same as that in Exemplary Embodiment 1, the outline of the composite plastic lens is the same as that in Exemplary Embodiment 1.

In Comparative Example 1, a cross-sectional shape including the optical axis 62 and the side gate 46 was set in such a manner that a distance of the turning surface forming portion 63 from the convex surface forming portion 48a and the surface 49 opposite to the convex surface forming portion 48a is not changed as it goes toward the lens periphery 66 and becomes constant. In other words, the angle F is 0°. The distance G between the member end portion 48d and the holder end portion 48e of the movable side convex surface mirror surface 43 is +0.1 mm.

The metal mold temperature regulation was 100° C., the cylinder temperature was 260° C., and the injection speed was from 1 to 50 mm/sec by using a screw cylinder having a diameter of 25 mm. In addition to the cavity 45, the metal mold has five cavities, which are the same as the cavity 45, so that six composite plastic lenses can be molded at one time. An orientation N of a pressure that the holder 61 receives from the holder 61 when the flow front 64b of the injected resin 64a comes into contact with the injected resin 64a at the time of molding contributed significantly to the direction toward the convex surface forming portion 48a, and hence the fused portion 65 of the holder 61 fused and transferred into the optical surface. In particular, in molding conditions used generally for lens molding with a low injection rate from 1 to 10 mm/sec, the amount of fusion and transfer of the holder 61 to the optical surface was significant.

In contrast, since the member end portion 48d and the holder end portion 48e were brought into substantially abutment with each other in the turning point forming portion 48b, when viewing the composite plastic lens of the Comparative Example 1 from the convex surface side, the shapes other than the optical surface of the lens are not visible, so that the ghost did not occur when used in the product.

Exemplary Embodiment 3

Exemplary Embodiments 3b to 3m have configurations in which the angle F and the distance G of Exemplary Embodiment 1 are changed variously. Results of experiment in Comparative Example 1 and Exemplary Embodiment 3 are shown in Table 2. In Comparative Example 1, fusion and transfer of the holder to the lens occurred.

Exemplary Embodiment 3b

The angle F was 25°, and the distance G was +1.1 mm. Other conditions were the same as Exemplary Embodiment 1.

Exemplary Embodiment 3c

The angle F was 25°, and the distance G was −1.1 mm. Other conditions were the same as Exemplary Embodiment 1.

Exemplary Embodiment 3d

The angle F was 5°, and the distance G was +0.1 mm. Other conditions were the same as Exemplary Embodiment 1.

Exemplary Embodiment 3e

The angle F was 5°, and the distance G was +1.0 mm. Other conditions were the same as Exemplary Embodiment 1.

Exemplary Embodiment 3f

The angle F was 5°, and the distance G was +1.1 mm. Other conditions were the same as Exemplary Embodiment 1.

Exemplary Embodiment 3g

The angle F was 5°, and the distance G was −0.1 mm. Other conditions were the same as Exemplary Embodiment 1.

Exemplary Embodiment 3h

The angle F was 5°, and the distance G was −1.0 mm. Other conditions were the same as Exemplary Embodiment 1.

Exemplary Embodiment 3i

The angle F was 5°, and the distance G was −1.1 mm. Other conditions were the same as Exemplary Embodiment 1.

Exemplary Embodiment 3j

The angle F was 10°, and the distance G was +1.1 mm. Other conditions were the same as Exemplary Embodiment 1.

Exemplary Embodiment 3k

The angle F was 10°, and the distance G was −1.1 mm. Other conditions were the same as Exemplary Embodiment 1.

Exemplary Embodiment 3l

The angle F was 80°, and the distance G was +1.1 mm. Other conditions were the same as Exemplary Embodiment 1.

Exemplary Embodiment 3m

The angle F was 80°, and the distance G was −1.1 mm. Other conditions were the same as Exemplary Embodiment 1.

TABLE 2

| | Angle F [°] | Distance G [mm] | Fusion and Transfer | Ghost |
|---|---|---|---|---|
| Comparative Example 1 | 0 | +0.1 | X | ◎ |
| Exemplary Embodiment 3b | 25 | +1.1 | ○ | ◎ |
| Exemplary Embodiment 3c | 25 | −1.1 | ◎ | ○ |
| Exemplary Embodiment 3d | 5 | +0.1 | ○ | ◎ |
| Exemplary Embodiment 3e | 5 | +1.0 | ○ | ◎ |
| Exemplary Embodiment 3f | 5 | +1.1 | ○ | ◎ |
| Exemplary Embodiment 3g | 5 | −0.1 | ○ | ◎ |
| Exemplary Embodiment 3h | 5 | −1.0 | ○ | ◎ |
| Exemplary Embodiment 3i | 5 | −1.1 | ○ | ○ |
| Exemplary Embodiment 3j | 10 | +1.1 | ○ | ◎ |
| Exemplary Embodiment 3k | 10 | −1.1 | ◎ | ○ |
| Exemplary Embodiment 3l | 80 | +1.1 | ○ | ◎ |
| Exemplary Embodiment 3m | 80 | −1.1 | ◎ | ○ |

Comparative Example 2

The angle F was 85°, and the distance G was +0.1 mm. Other conditions were the same as Exemplary Embodiment 1. Although fusion and transfer to the optical surface, the thickness of the holder 32 at a portion coming into contact with the protrusion 35 becomes too thin, so that the light-shielding effect of the holder is not achieved sufficiently when viewing the composite plastic lens of Comparative Example 2 from the convex surface 36a side, and the shape other than the optical surface of the lens could be seen through.

This disclosure provides a composite plastic lens which suppresses a resin light-shielding holder from fusing and transferring to a resin lens and reduces a probability of occurrence of ghost, and a method of manufacturing the composite plastic lens.

The composite plastic lens of the present invention suppresses the resin light-shielding holder from fusing and transferring to the resin lens and reduces a probability of occurrence of ghost, and hence may be widely used in image-taking lenses for cameras, finders for cameras, and binocular glasses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A camera having a lens comprising:
    a resin lens including a convex surface, a surface on the side opposite to the convex surface, a side surface, a protrusion protruding from at least part of the side surface; and
    a resin light-shielding holder configured to hold the resin lens,
    wherein the resin lens is joined with the resin light-shielding holder at least at the protrusion on the side of the convex surface, and an interface of the resin light-shielding holder with respect to the protrusion on the side of the convex surface is inclined inward from an outer periphery of the lens in a direction approaching the surface on the side opposite to the convex surface; and
    an angle F formed between the interface and a plane including a line orthogonal to an optical axis falls within a range from 5° to 80°.

2. The camera according to claim 1, wherein the resin lens includes styrene resin, polycarbonate resin, methacrylate resin, or olefin resin.

3. The camera according to claim 2, wherein the resin light-shielding holder is a resin including at least one of ABS resin, nylon resin, and polycarbonate resin or a resin including at least one of ABS resin, nylon resin, and polycarbonate resin mixed with at least one of fillers including glass bead, glass fiber, or carbon fiber.

4. The camera according to claim 1, wherein the softening temperature of the resin light-shielding holder is higher than the softening temperature of the resin lens.

5. A photographing lens for a camera having a lens comprising:
    a resin lens including a convex surface, a surface on the side opposite to the convex surface, a side surface, a protrusion protruding from at least part of the side surface; and
    a resin light-shielding holder configured to hold the resin lens,
    wherein the resin lens is joined with the resin light-shielding holder at least at the protrusion on the side of the convex surface, and an interface of the resin light-shielding holder with respect to the protrusion on the side of the convex surface is inclined inward from an outer periphery of the lens in a direction approaching the surface on the side opposite to the convex surface; and an angle F formed between the interface and a plane including a line orthogonal to an optical axis falls within a range from 5° to 80°.

6. The photographing lens for a camera according to claim 5, wherein the resin lens includes styrene resin, polycarbonate resin, methacrylate resin, or olefin resin.

7. The photographing lens for a camera according to claim 6, wherein the resin light-shielding holder is a resin including at least one of ABS resin, nylon resin, and polycarbonate resin or a resin including at least one of ABS resin, nylon resin, and polycarbonate resin mixed with at least one of fillers including glass bead, glass fiber, or carbon fiber.

8. The photographing lens for a camera according to claim 5, wherein the softening temperature of the resin light-shielding holder is higher than the softening temperature of the resin lens.

9. A method of manufacturing a lens including a resin lens having a first portion and a second portion protruding from the first portion and a resin light-shielding holder configured to hold the resin lens comprising:
preparing a mold member which includes (i) a first cavity for forming the first portion of the resin lens and (ii) a second cavity for forming the second portion of the resin lens and for arranging the resin light-shielding holder,
arranging the resin light-shielding holder in the second cavity, wherein a space communicate with the first cavity is formed between the inner surface of the second cavity and the resin light-shielding holder arranged in the second cavity; and
injecting a resin into the first cavity and the space for forming the first and second portions,
wherein the space becomes narrower as it goes toward the first cavity.

10. The method of manufacturing a lens according to claim 9, wherein the resin light-shielding holder is a resin including at least one of ABS resin, nylon resin, and polycarbonate resin or a resin including at least one of ABS resin, nylon resin, and polycarbonate resin mixed with at least one of fillers including glass bead, glass fiber, or carbon fiber.

11. The method of manufacturing a lens according to claim 9, wherein the softening temperature of the resin light-shielding holder is higher than the softening temperature of the resin lens.

12. A camera in which the lens manufactured by the method according to claim 9 is incorporated.

13. A photographing lens for a camera in which the lens manufactured by the method according to claim 9 is incorporated.

14. A finder for a camera in which the lens manufactured by the method according to claim 9 is incorporated.

15. The method of manufacturing a lens according to claim 9, wherein the resin lens includes styrene resin, polycarbonate resin, methacrylate resin, or olefin resin.

16. A finder for a camera having a lens comprising:
a resin lens including a convex surface, a surface on the side opposite to the convex surface, a side surface, a protrusion protruding from at least part of the side surface; and
a resin light-shielding holder configured to hold the resin lens,
wherein the resin lens is joined with the resin light-shielding holder at least at the protrusion on the side of the convex surface, and an interface of the resin light-shielding holder with respect to the protrusion on the side of the convex surface is inclined inward from an outer periphery of the lens in a direction approaching the surface on the side opposite to the convex surface; and an angle F formed between the interface and a plane including a line orthogonal to an optical axis falls within a range from 5° to 80°.

17. The finder for a camera according to claim 16, wherein the resin lens includes styrene resin, polycarbonate resin, methacrylate resin, or olefin resin.

18. The finder for a camera according to claim 17, wherein the resin light-shielding holder is a resin including at least one of ABS resin, nylon resin, and polycarbonate resin or a resin including at least one of ABS resin, nylon resin, and polycarbonate resin mixed with at least one of fillers including glass bead, glass fiber, or carbon fiber.

19. The finder for a camera according to claim 16, wherein the softening temperature of the resin light-shielding holder is higher than the softening temperature of the resin lens.

20. A lens comprising:
a resin lens including a convex surface, a surface on the side opposite to the convex surface, a side surface, a protrusion protruding from at least part of the side surface; and
a resin light-shielding holder configured to hold the resin lens,
wherein the resin lens is joined with the resin light-shielding holder at least at the protrusion on the side of the convex surface, and an interface of the resin light-shielding holder with respect to the protrusion on the side of the convex surface is inclined inward from an outer periphery of the lens in a direction approaching the surface on the side opposite to the convex surface; and
an angle F formed between the interface and a plane including a line orthogonal to an optical axis falls within a range from 5° to 80°.

21. The lens according to claim 20, wherein the resin lens includes styrene resin, polycarbonate resin, methacrylate resin, or olefin resin.

22. The lens according to claim 21, wherein the resin light-shielding holder is a resin including at least one of ABS resin, nylon resin, and polycarbonate resin or a resin including at least one of ABS resin, nylon resin, and polycarbonate resin mixed with at least one of fillers including glass bead, glass fiber, or carbon fiber.

23. The lens according to claim 20, wherein the softening temperature of the resin light-shielding holder is higher than the softening temperature of the resin lens.

24. A method of manufacturing a lens including: a resin lens including a convex surface, a surface on the side opposite to the convex surface, a side surface, and a protrusion protruding from at least part of the side surface; a resin light-shielding holder configured to hold the resin lens, comprising:
forming a cavity including a first space having the shape for transferring the convex surface and the shape for transferring a surface on the side opposite to the convex surface formed in a mold and a second space formed by a depressed portion of the resin light-shielding holder inserted in the mold; and
injecting the resin into the cavity from the depressed portion;
wherein the second space becomes narrower as it goes toward the first space.

25. The method of manufacturing a lens according to claim 24, wherein a protruding amount of the resin light-shielding holder between the first space and the second space in the cavity is not larger than 1.1 mm.

26. The method of manufacturing a lens according to claim 24, wherein a protruding amount of the mold between the first space and the second space in the cavity is not larger than 1.1 mm.

* * * * *